(12) United States Patent
Gugger et al.

(10) Patent No.: US 12,317,905 B2
(45) Date of Patent: Jun. 3, 2025

(54) LOW SUGAR, HIGH PROTEIN CONFECTION

(71) Applicant: General Mills, Inc., Minneapolis, MN (US)

(72) Inventors: Eric T. Gugger, Plymouth, MN (US); Michael Li, St. Louis Park, MN (US); Eva Ordovas, Tarazona (ES)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/909,004

(22) PCT Filed: Apr. 1, 2020

(86) PCT No.: PCT/US2020/026154
§ 371 (c)(1),
(2) Date: Sep. 2, 2022

(87) PCT Pub. No.: WO2021/201862
PCT Pub. Date: Oct. 7, 2021

(65) Prior Publication Data
US 2023/0089077 A1    Mar. 23, 2023

(51) Int. Cl.
*A23G 3/38* (2006.01)
*A23G 3/40* (2006.01)
*A23G 3/44* (2006.01)
*A23G 3/46* (2006.01)

(52) U.S. Cl.
CPC ............... *A23G 3/38* (2013.01); *A23G 3/40* (2013.01); *A23G 3/44* (2013.01); *A23G 3/46* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 2004/0228951 | A1* | 11/2004 | Schmidt | A23L 9/22 426/89 |
| 2004/0228957 | A1* | 11/2004 | Schmidt | A23G 3/368 426/633 |
| 2005/0002989 | A1* | 1/2005 | Palmer | A23G 1/44 424/439 |
| 2007/0087084 | A1* | 4/2007 | Coleman | A23G 3/34 426/89 |
| 2015/0216199 | A1 | 8/2015 | Porter et al. | |

FOREIGN PATENT DOCUMENTS

| | | |
|---|---|---|
| EP | 1774856 | 4/2007 |
| EP | 1839496 | 10/2007 |
| WO | WO 2005/089255 | 9/2005 |
| WO | WO 2020/007650 | 1/2020 |

\* cited by examiner

*Primary Examiner* — Stephanie A Cox
(74) *Attorney, Agent, or Firm* — Rachel Kahler

(57) ABSTRACT

A low or no sugar, high protein confection is described. A confection includes a beneficial combination of soluble fiber, whey protein, glycerol and fat at an acidic pH and particular Brix range to mimic the texture and mouthfeel of caramel or cream confection. Methods of making a confection are also described.

9 Claims, 4 Drawing Sheets

LOW SUGAR, HIGH PROTEIN CONFECTION

CROSS-REFERENCE TO RELATED APPLICATIONS

This application represents a National stage application of PCT/US2020/026154, filed Apr. 1, 2020, entitled "Low Sugar, High Protein Confection", pending. The entire content of this application is incorporated by reference.

BACKGROUND

Consumers are increasingly looking for foods that meet their nutritional needs without requiring preparation. Shelf stable snack items are a category of ready-to-eat foods that can be challenging to make fit both nutritional needs and a desired eating experience. Ready-to-eat products that contain low or no sugar and net carbohydrate content provide a challenge for delivering a desirable taste and texture over the shelf life of the product. Thus, there is a need for good-tasting ready-to-eat products that meet desired nutritional needs and retain a desirable eating experience over shelf life.

SUMMARY

The present disclosure relates to a low sugar, high protein confection that has a desirable texture, extended shelf life, and good manufacturability.

A confection is disclosed herein. The confection can include soluble fiber having a DP of less than 10, the soluble fiber in an amount of about 30% to about 70% by dry weight of the confection, whey protein in an amount of at least 7% to about 25% by dry weight of the confection, glycerol in an amount of about 5% to about 18% by dry weight of the confection, a fat in an amount of from about 5% to about 20% by dry weight of the confection, emulsifier in an amount of up to 5% by dry weight of the confection, a pH of less than 6, and a Brix of 80-85° Bx at room temperature. In some embodiments, the confection contains sugar in an amount of less than 2% by dry weight of the confection.

In some embodiments, the soluble fiber can comprise inulin.

In some embodiments, the soluble fiber can be included in an amount of about 40% to about 70% by dry weight of the confection.

In some embodiments, the whey protein can be included in an amount of about 8% to about 15% by dry weight of the confection.

In some embodiments, the glycerol can be included in an amount of about 8% to about 12% by dry weight of the confection.

In some embodiments, the fat can be included in an amount of about 5% to about 11% by dry weight of the confection.

In some embodiments, the pH can be from about 3 to about 5.8.

In some embodiments, the confection can have a viscosity of less than $1 \times 10^2$ Pa*s at 10 l/s at 70° C., and a viscosity of more than $4 \times 10^1$ Pa*s at 10 l/s at 40° C.

A method of making a confection is also provided. A method of making a confection can include combining whey protein with a fat with sufficient shear to disperse the whey protein in the fat to produce a fat/protein suspension, and at a pH of less than 6, combining the fat/protein suspension with a liquid ingredient comprising soluble fiber, the soluble fiber having a DP of less than 10 to produce the confection, the confection comprising the soluble fiber in an amount of about 30% to about 70% by dry weight of the confection, the whey protein in an amount of at least 7% to about 25% by dry weight of the confection, glycerol in an amount of about 5% to about 18% by dry weight of the confection, a fat in an amount of from about 5% to about 20% by dry weight of the confection, emulsifier in an amount of up to 5% by dry weight of the confection, and a pH of less than 6.

In some embodiments, a method can further include adjusting a pH to achieve the pH of pH of less than 6. In some embodiments, adjusting the pH can include adding an organic acid.

In some embodiments, the combining step can be performed at a temperature of less than 50° C. and a pH of less than 5.

In some embodiments, a method can further include adjusting the Brix of the confection to 80-85° Bx at room temperature. In some embodiments, adjusting the Brix can include removing water from the confection. In some embodiments, removing water from a confection comprises heating the confection to a temperature of from about 80° C. to about 110° C. and/or applying a vacuum to the confection. In some embodiments, adjusting the Brix can include adding water to a confection.

In some embodiments, a method can further include applying the confection to a food piece.

In some embodiments of a method provided herein, the confection can have a viscosity of less than $1 \times 10^2$ Pa*s at 10 l/s at 70° C., and a viscosity of more than $4 \times 10^1$ Pa*s at 10 l/s at 40° C.

In some embodiments of a method provided herein, the confection can include a soluble fiber in an amount of about 40% to about 70% by dry weight of the confection, a whey protein in an amount of at least 8% to about 15% by dry weight of the confection, glycerol in an amount of about 8% to about 12% by dry weight of the confection, a fat in an amount of from about 5% to about 11% by dry weight of the confection, and a pH from about 3 to about 5.8.

These and various other features and advantages will be apparent from a reading of the following detailed description.

DETAILED DESCRIPTION

Figure 1:
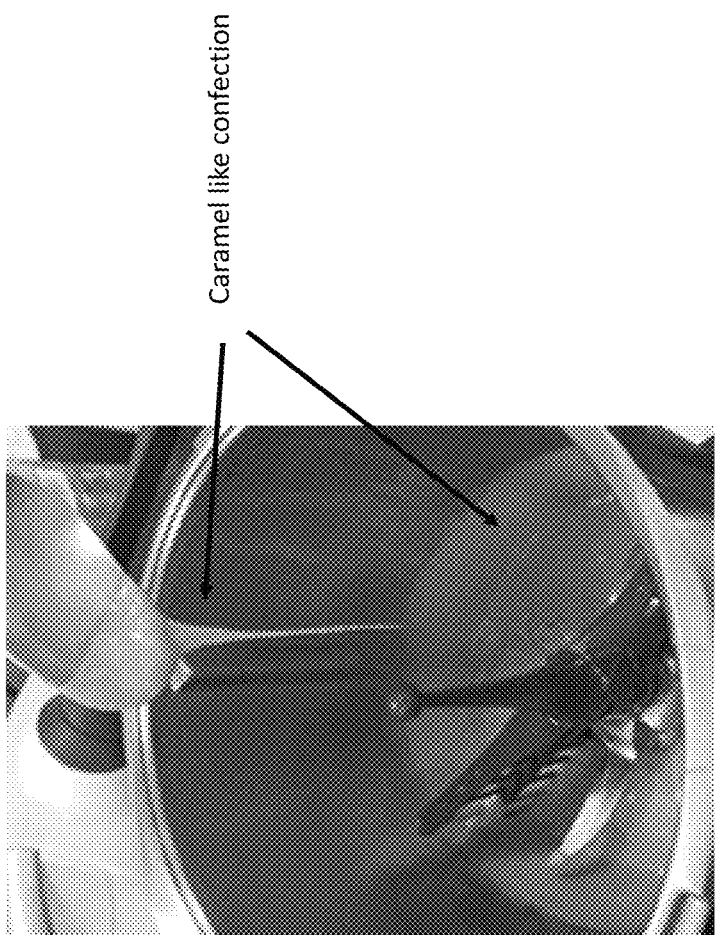
FIG. 1 is a picture of an embodiment of a caramel like confection described herein. The confection clings to a spoon at room temperature and stretches to form an elongated string in a similar manner to a caramel.

Consumers often look for convenient foods that fit a desired nutritional profile. Foods that have no refined sugar and/or have low net carbohydrate content fit one such nutritional profile. Achieving low net carbohydrate content and/or low or no sugar content is a particular challenge for confections because sugar not only provides sweetness for many confections, such as caramel, but also plays a significant role in their structure and functionality. As a result, reducing or removing sugar content in a confection, particularly sucrose content, can negatively impact flavor, texture, and overall functionality. Although at least some of the sweetness of sugar can be replaced by using non-sugar sweeteners, such as sugar alcohols (e.g., erythritol, maltitol, and the like) and high intensity sweeteners (e.g., sucralose, stevia extract, and the like), non-sugar sweeteners fail to provide texture and function of sugar. That is, while confections that replace sugars with non-sugar sweeteners, such as erythritol or maltitol, can taste similar to a sugar containing version of the confections, such sugar-free confections often suffer texture deficiencies, such as grittiness or a mouthfeel that differs from what would be expected of the sugar containing version.

In addition, confections that contain no sugar, such as sugar-free caramel, can taste similar to sugar containing confections they're designed to replace, but do not function well in manufacturing settings, which have different challenges than home kitchen settings.

It was discovered, and is disclosed herein, that a confection can be made containing essentially no sugar that provides an eating experience similar to a caramel or cream confection, particularly when it is applied as a layer in a shelf stable food item, such as a snack bar. A confection provided herein includes a soluble fiber, whey protein, glycerol, and fat at an acidic pH and a Brix of 80 to 85. This combination of features not only provides an eating experience that is similar to a caramel or cream confection, but also provides manufacturing advantages. For example, a confection described herein can readily be handled by standard manufacturing equipment for pumping and extruding liquids, without clumping or excess viscosity. In another example, a confection described herein can have a viscosity when cooled that provides handling benefits. A confection described herein can also provide an advantage of having an extended shelf life without significant reduction in desired eating quality.

As used herein, the term "essentially no sugar" refers to containing sugars only incidental to the use of ingredients that may contain small amounts of sugar. Examples of such ingredients include, for example, fiber ingredients (e.g., inulin, soluble corn fiber, and the like) and flavorants (e.g., vanilla, fruit flavors, caramel flavor, and the like). In some embodiments, a confection provided herein contains less than 2% (e.g., less than 1%, or less than 0.5%) sugar by weight.

A confection provided herein includes a soluble fiber in an amount of about 30% to about 70% (e.g., about 40% to about 70%, or about 50% to about 70%) by dry weight of the confection. Preferably, a soluble fiber included in a confection provided herein has a degree of polymerization (DP) of less than 10 (e.g., from 3 to 9). A soluble fiber in a confection provided herein can contribute to a desirable viscosity. In some cases, a soluble fiber in a confection provided herein can contribute to a caramel-like texture that stretches when pulled. Suitable fiber includes, for example, inulin, polydextrose, soluble corn fiber, sugarcane fiber (cellulose), or any combination thereof. In some embodiments, a fiber syrup, such as liquid inulin, liquid soluble corn fiber, and liquid polydextrose can be used. In some embodiments, a combination of a fiber syrup and a powdered fiber can be used. For example, a combination of a liquid inulin and a powdered inulin can reduce absorption of a confection provided herein when it is applied to a porous food piece, such as a cold formed snack bar, a soft baked snack piece, or a wafer piece.

A confection provided herein includes a whey protein in an amount of at least 7% to about 25% (e.g., about 8% to about 20%, about 8% to about 15%, or about 8% to about 12%) by dry weight of the confection. Whey protein in a confection provided herein can contribute to a texture that conveys a desirable density in the mouth. Whey protein in a confection provided herein can also contribute to a flavor profile that is similar to confections that contain milk. It was surprisingly found that whey protein can be included in relatively high amounts in a confection provided herein if the pH of the confection was held below a pH of 6 (e.g., about 3 to about 5.8). Whey proteins that are particularly suitable have a relatively small average particle size. For example, whey protein that is concentrated using an ion-exchange membrane can be particularly useful in a confection provided herein.

Glycerol is included in a confection provided herein in an amount of from about 5% to about 18% (e.g., about 7% to about 15%, or about 8% to about 12%) by dry weight of the confection. Glycerol in a confection provided herein can contribute to stable texture and moisture level during shelf life.

A fat is included in a confection provided herein in an amount of about 5% to about 20% (e.g., about 5% to about 18%, about 5% to about 15%, or about 5% to about 11%) by dry weight of the confection. A fat can provide a desired lubricity in the mouth upon consumption reminiscent of milk fats in a caramel or cream confection. Any edible fat can be used in a confection provided herein. A fat type and an amount of fat can be adjusted based on a desired texture and/or mouthfeel of a confection provided herein. Particularly suitable fats for providing a creamy mouthfeel include liquid oils (e.g., sunflower oil, canola oil, and the like), shortenings (e.g., palm based shortenings, coconut oil based shortenings, and the like), and low to moderate melt point solid fats (e.g., whole palm oil, palm kernel oil, coconut oil, and the like). Although higher melt point fats (e.g., stearines and stearine blends) can be used, they are more likely to create a waxy mouthfeel when included at amounts at the higher end of the range. A fat type and an amount of fat can also be adjusted based on the desired nutritional profile of a confection provided herein.

In some embodiments, an emulsifier can be included in a confection provided herein in an amount of up to 5% (e.g., up to 3%, up to 2%, or up to 1.5%) by dry weight of the confection. Any appropriate emulsifier can be used. In some embodiments, some or all of the emulsifier content can be included in a fat ingredient used in a confection.

pH of a confection provided herein is less than 6 (e.g., from about 3 to about 5.8). A pH of less than 6 can prevent gelling of a whey protein provided herein. Surprisingly, although whey protein in a confection provided herein is not soluble at a pH below 5.3, a pH at or above 5.3 and below 6 (e.g., about 5.8) still provides the desired flavor and texture profile without significant gelling. pH of a confection provided herein can be adjusted using any suitable acidulent. Particularly useful are organic acids, such as citric acid, lactic acid, and malic acid.

In some embodiments, where a caramel-like texture and eating profile are desired, a confection can have a pH of about 3 to about 5.8. In some embodiments, where a creamy confection texture and eating profile are desired, a confection can have a pH below 5 (e.g., about 3 to about 4). Surprisingly, in confections where the pH is below 5, the confection can resist browning for at least 6 months (e.g., at least 7 months, or at least 8 months) during shelf life. This is particularly useful in embodiments where a white color is desired, such as a white color enhanced using a starch ingredient.

A confection provided herein has a Brix of 80° Bx to 85° Bx (e.g., 83° Bx to 85° Bx). As used herein, Brix measures soluble solids content rather than sugar content. Brix is measured using a hand held refractometer at room temperature. A Brix of 80° Bx to 85° Bx can contribute to a viscosity of a confection that provides a mouthfeel similar to caramel or a cream confection. A Brix of 80° Bx to 85° Bx can also contribute to ensuring that a confection provided herein has sufficiently low viscosity during manufacture that it can be pumped and extruded without needing special equipment.

In some embodiments, a confection provided herein can have a viscosity of less than $1 \times 10^2$ Pa*s at 10 l/s at 70° C. Such a viscosity can ensure that a confection can be manufactured using standard equipment. In some embodiments, a confection provided herein can have a viscosity of more than $4 \times 10^1$ Pa*s at 10 l/s at 40° C. Such a viscosity can ensure that a confection does not excessively spread or drip once cooled. A viscosity of more than $4 \times 10^1$ Pa*s at 10 l/s at 40° C. can also contribute to a desirable texture of a confection resembling caramel or a cream confection.

In some embodiments, additional ingredients can be included in a confection provided herein. For example, one or more colorant can be included (e.g., a caramel color, a whitening agent, such as a starch, a fruit or vegetable dye or extract, and the like) to provide a pleasing appearance. In another example, one or more flavorant can be included (e.g., salt, vanilla extract, fruit or vegetable flavors, protein masking flavors, and the like) to provide a desired flavor.

A confection provided herein is particularly suited to being used as a layer or topping on a base food piece, such as a snack bar, a cookie, a wafer, and the like. In some embodiments, a confection provided herein can be sandwiched between layers and/or covered in a coating, such as a compound coating or a chocolate coating.

Also provided herein are methods of making a confection provided herein. A method of making a confection can include combining whey protein with a fat with sufficient shear to disperse the whey protein in the fat to produce a fat/protein suspension. Any suitable equipment that can produce sufficient shear to disperse whey protein in a fat can be used. For example, a kettle mixer, automatic whisk, blender, extruder, and the like can be used to combine whey protein with a fat to produce a fat/protein suspension. Generally, a fat should be in liquid form during production of a fat/protein suspension. If a fat that is not liquid at room temperature is used, a fat/protein suspension can be produced at a temperature at or above the melting point of the fat.

In some embodiments, a fat/protein suspension can include additional ingredients, such as glycerol and emulsifier.

A fat/protein suspension can be combined with a liquid ingredient at a pH of less than 6 (e.g., from about 3 to about 5.8) to produce a confection described above. A liquid ingredient includes a soluble fiber as described above. In some embodiments, a liquid ingredient can also contain one or more one or more additional ingredient, such as glycerol, emulsifier, flavorants, colorants, and the like. In some embodiments, a fat/protein suspension can be formed at the same time as being combined with a liquid ingredient. A fat/protein suspension can be combined with a liquid ingredient using any appropriate method. Generally, combining a fat/protein suspension with a liquid ingredient needs only sufficient mixing to ensure complete incorporation of ingredients.

In some embodiments, a fat/protein suspension can be combined with a liquid ingredient at a temperature of less than 115° C. (e.g., from about 60° C. to about 110° C., or from about 80° C. to about 110° C.). A temperature between about 60° C. to about 110° C. (e.g., about 80° C. to about 110° C., or from 100° C. to about 110° C.) and a pH of about 4 to less than 6 (e.g., about 5 to about 5.8) is particularly useful for producing a caramel-like confection. In some embodiments, a fat/protein suspension can be combined with a liquid ingredient at a temperature of less than 50° C. (e.g., about 30° C. to less than 50° C., or from about 30° C. to about 45° C.). A temperature of less than 50° C. (e.g., about 30° C. to less than 50° C., or from about 30° C. to about 45° C.) and a pH of less than 5 (e.g., about 3 to about 4) is particularly useful for producing a cream confection. In some embodiments, a temperature of less than 50° C. can facilitate forming a fat/protein suspension at the same time as being combined with a liquid ingredient.

In some embodiments, a step of adjusting pH can be included in a method of making a confection described herein. In some embodiments, pH can be adjusted using an organic acid as described above. In some embodiments pH of a liquid ingredient can be adjusted before combining with a fat/protein suspension. In some embodiments, pH can be adjusted during combination of a liquid ingredient with a fat/protein suspension. In some embodiments, pH can be further adjusted following combination of a liquid ingredient with a fat/protein suspension.

In some embodiments, a step of adjusting Brix of the confection can be included in a method of making a confection described herein. In some embodiments, Brix can be adjusted to 80° Bx to 85° Bx (e.g., 83° Bx to 85° Bx). Any suitable method for adjusting Brix can be used. Brix can be adjusted by adding water to decrease Brix or removing water to increase Brix using any suitable method or combination of methods. In some embodiments, Brix can be adjusted by heating (e.g., to a temperature of about 80° C. to about 110° C., or about 100° C. to about 110° C.) a confection to release water. In some embodiments, a vacuum can be applied to a confection with or without heating the confection to remove water from the confection.

In some embodiments, flavorants and/or colorants can be added to a confection after adjusting Brix. This is particularly useful in embodiments where Brix is adjusted by heating a confection, where the confection can be cooled (e.g., to a temperature below 80° C.) before adding temperature sensitive ingredients, such as flavorants and colorants.

In some embodiments, temperature of a confection can be adjusted as appropriate to facilitate manufacture. For example, a temperature of a confection can be adjusted to a temperature of from about 60° C. to about 80° C. (e.g., about 65° C. to about 75° C.) to facilitate pumping the confection using standard equipment. In another example, a temperature of a confection can be adjusted to a temperature of less than 50° C. (e.g., about 25° C. to about 45° C., or about 35° C. to about 45° C.) to facilitate extruding the confection onto a surface, such as a surface of a conveyer or a base food piece. In some embodiments, a confection can be further cooled (e.g., to a temperature of less than 30° C., or about room temperature or less) before packaging.

In some embodiments of a method described herein, a confection can be packaged either alone or as a part of a food composition that includes the confection and a base food piece. Any suitable packaging can be used, including packaging that accommodates a single serving or multiple servings.

The following examples are provided to show selected embodiments of the invention described herein. The examples are not intended to limit the invention to any particular embodiment.

EXAMPLES

Example 1

Caramel like confections were successfully produced with 8-15% dry weight whey protein (as whey protein isolate), 50-70% dry weight fiber (inulin and polydextrose were tested), dry weight 5-18% glycerol, dry weight 5-15% fat (a palm-based shortening and a palm oil were tested), 0.5-1.5% dry weight flavorant (salt, caramel flavor), <1% dry weight colorant, and 0.5-1.5% dry weight of an emulsifier (lecithin). A caramel like confection was made at industrial scale using the following protocol. A first suspension was made with a portion of the whey protein isolate (WPI) combined with fat and lecithin. A second suspension was made with the remaining WPI combined with glycerol. Liquid inulin was combined with salt, and then the pH was adjusted to pH 5.8 or less with a 50/50 w/w solution of citric acid and stirred to combine (150-300 seconds at 60 Hz) to produce a liquid ingredient. The first and second suspensions were added to the liquid ingredient and stirred to combine (150-300 seconds at 60 Hz). The combined ingredients were heated to 106-107° C. with stirring, and a vacuum was applied until the desired Brix (83° Bx to 85° Bx) was reached. Water could be added if the desired Brix was too high. Caramel flavor was added after cooling below 80° C. Brix could be adjusted after adding flavor with additional water removal (e.g., by additional stirring at below 80° C.) if too low, or addition of water if too high without adverse effects.

Figure 3:
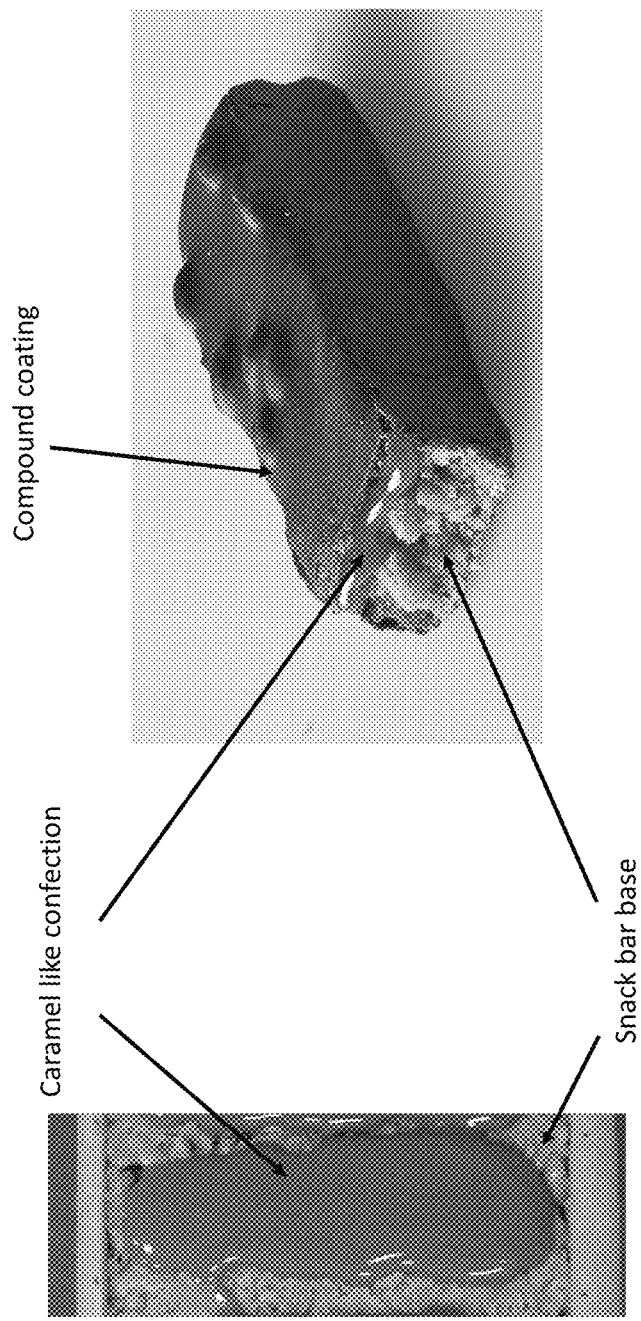
FIG. 3 shows a base snack bar topped with a caramel like confection according to an embodiment of the present invention on the left. On the right is a picture of a snack bar base with a layer of a caramel like confection described herein and further coated with a compound coating. The pictures illustrate how a caramel like confection can be applied to a base food piece without excessive dripping or spread (left) while still providing a texture similar to a caramel layer in a finished product.

The caramel like confections exhibited a smooth, caramel-like texture and was visually very similar to caramel. See, FIG. 1. In addition, the caramel like confections exhibited a viscosity of less than $1 \times 10^2$ Pa*s at 10 l/s at 70° C., which made them pumpable using standard equipment. The caramel like confections also exhibited a viscosity of more than $4 \times 10^1$ Pa*s at 10 l/s at 40° C., which ensured that they did not flow excessively when applied to a surface at an extrusion temperature of about 40° C. See, FIG. 3. Although little to no browning reactions occurred during cooking, caramel color and caramel flavoring could be used and adjusted to achieve the desired color and flavor.

It was observed that if the pH was not adjusted below 6, the texture was too viscous and couldn't be pumped and/or the confection was lumpy. If the whey protein was not combined with the fat to form a fat/protein suspension before combining with the liquid ingredient, the confection was lumpy. If the Brix was lower than 83° Bx, the confection was too runny when applied to a surface. If the Brix was higher than 85° Bx, the confection was not pumpable.

Example 2

White, cream like confections were successfully produced with 8-15% dry weight whey protein (as WPI), 50-70% dry weight fiber (a combination of liquid and powdered inulin), dry weight 5-18% glycerol, dry weight 5-15% fat, <1% dry weight flavorant, 1-2% starch, and <1% dry weight of an emulsifier. A white, cream like confection was made at industrial scale using the following protocol. Fat and lecithin were added to a room temperature kettle followed by glycerol and stirred to combine (100-200 seconds at 60 Hz). Liquid inulin was then added and the composition was stirred to combine (60-120 seconds at 60 Hz). A lactic acid solution was added with stirring to adjust the pH to 3-4. WPI, powdered inulin, and all other ingredients were added and stirred to combine (120-200 seconds at 50 Hz) to produce the cream like confections. The cream like confection was readily pumpable at about 45-50° C. (typically around 48° C.). Brix did not need to be adjusted, and was typically around 80° Bx to 81° Bx.

Figure 2:
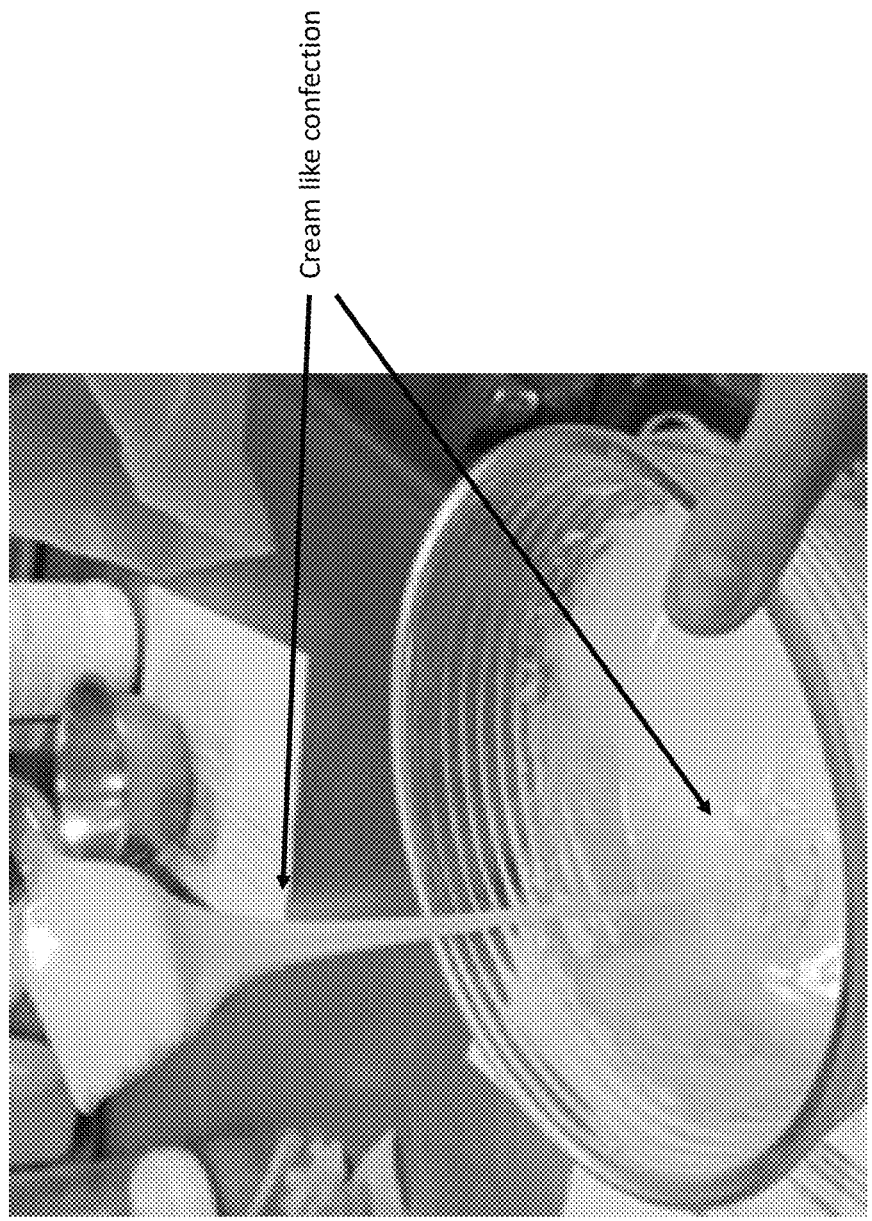
FIG. 2 is a picture of an embodiment of a cream like confection described herein. The confection coats a fork at room temperature and exhibits a viscous texture similar to a cream confection.
Figure 4:
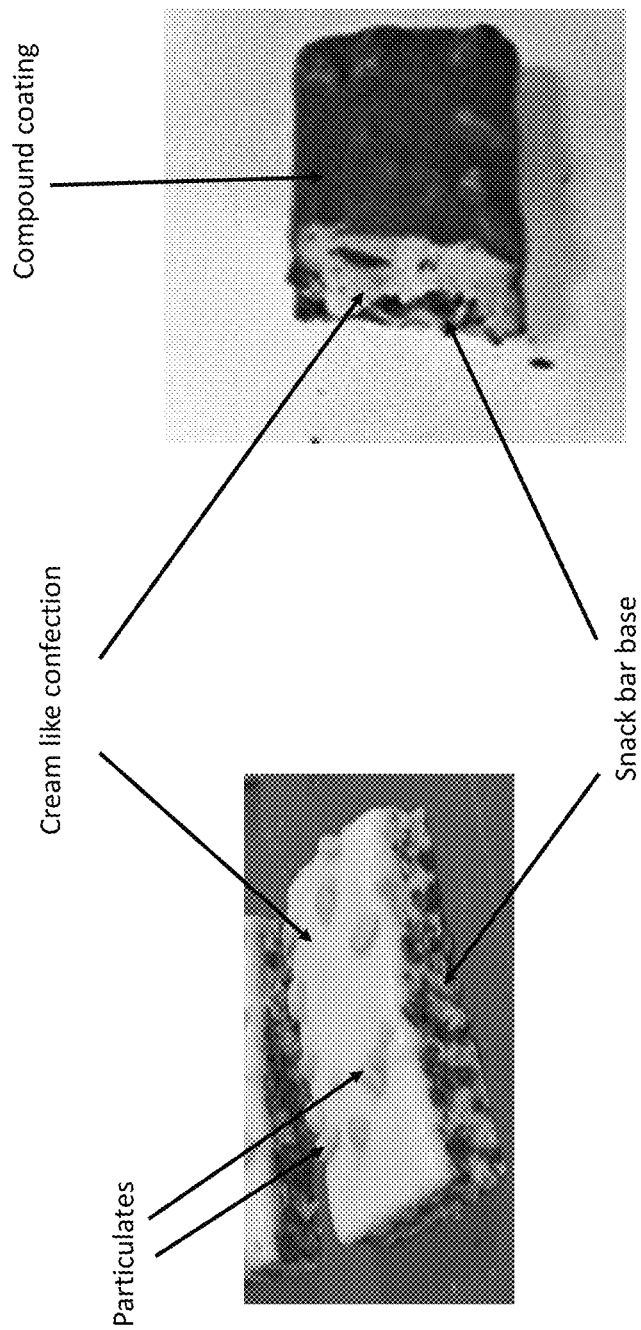
FIG. 4 shows a base snack bar topped with a cream like confection according to an embodiment of the present invention, along with particulates on top of the cream like confection, on the left. On the right is a picture of a snack bar base with a layer of a cream like confection described herein and further coated with a compound coating. The pictures illustrate how a cream like confection can be applied to a base food piece without excessive dripping or spread (left) while still providing a texture similar to a cream layer in a finished product.

The cream like confections exhibited a smooth, cream confection texture and retained a very white color due to the starch, which was shelf stable for several months. See FIG. 2. In addition, the cream like confections exhibited a similar viscosity profile as the caramel like confections in Example 1, which ensured that they did not flow excessively when applied to a food base while remaining pumpable. See, FIG. 4. The cream like confections were extremely versatile for adding colorant and/or flavorant to achieve a desired flavor (e.g., vanilla cream, strawberry cream, and the like).

It was observed that if the pH was not adjusted below 5 (e.g., 3-4), the white color suffered from browning.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A confection, the confection being a caramel-like confection or a cream-like confection and comprising less than 2% sugar by weight, the confection including:
   a. soluble fiber having a DP of less than 10, the soluble fiber in an amount of about 30% to about 70% by dry weight of the confection;
   b. whey protein in an amount of at least 7% to about 25% by dry weight of the confection;
   c. glycerol in an amount of about 5% to about 18% by dry weight of the confection;
   d. a fat in an amount of from about 5% to about 20% by dry weight of the confection; and
   e. emulsifier in an amount of up to 5% by dry weight of the confection;
   wherein the confection has a pH of less than 6,
   a Brix of 80-85° Bx at room temperature, a viscosity of less than $1 \times 10^2$ Pa*s at 10 l/s at 70° C., and a viscosity of more than $4 \times 10^1$ Pa*s at 10 l/s at 40° C.

2. The confection of claim 1, wherein the soluble fiber comprises inulin.

3. The confection of claim 1, wherein the soluble fiber is included in an amount of about 40% to about 70% by dry weight of the confection.

4. The confection of claim 1, wherein the whey protein is included in an amount of about 8% to about 15% by dry weight of the confection.

5. The confection of claim 1, wherein the glycerol is included in an amount of about 8% to about 12% by dry weight of the confection.

6. The confection of claim 1, wherein the fat is included in an amount of about 5% to about 11% by dry weight of the confection.

7. The confection of claim 1, wherein the pH is from about 3 to about 5.8.

8. The confection of claim 1, consisting of:
   a. soluble fiber having a DP of less than 10, the soluble fiber in an amount of about 50% to about 70% by dry weight of the confection;
   b. whey protein in an amount of at least 7% to about 25% by dry weight of the confection;
   c. glycerol in an amount of about 5% to about 18% by dry weight of the confection;
   d. a fat in an amount of from about 5% to about 20% by dry weight of the confection;
   e. emulsifier in an amount of up to 5% by dry weight of the confection; and
   f. one or more additional ingredient selected from the group consisting of:
      i) an acidulent;
      ii) a flavorant;
      iii) a colorant; and
      iv) a starch, wherein the confection has a pH of less than 6 and a Brix of 80-85° Bx at room temperature.

9. A confection, the confection being a caramel-like confection or a cream-like confection and comprising less than 2% sugar by weight, the confection consisting of:
   a. soluble fiber having a DP of less than 10, the soluble fiber comprising inulin, polydextrose, or soluble corn fiber in an amount of about 50% to about 70% by dry weight of the confection;
   b. whey protein in an amount of at least 7% to about 25% by dry weight of the confection;
   c. glycerol in an amount of about 5% to about 18% by dry weight of the confection;
   d. a fat in an amount of from about 5% to about 20% by dry weight of the confection;
   e. emulsifier in an amount of up to 5% by dry weight of the confection;
   f. one or more additional ingredient selected from the group consisting of:
      i) an acidulent;
      ii) a flavorant;
      iii) a colorant; and
      iv) a starch;

wherein the confection has a pH of less than 6, a Brix of 80-85° Bx at room temperature, a viscosity of less than $1\times10^2$ Pa*s at 10 l/s at 70° C., and a viscosity of more than $4\times10^1$ Pa*s at 10 l/s at 40° C.

* * * * *